Dec. 10, 1968   W. H. KERRIGAN   3,415,566
STREAMLINING APPARATUS FOR CARGO CARRYING VEHICLES
Filed Jan. 16, 1967   2 Sheets-Sheet 1
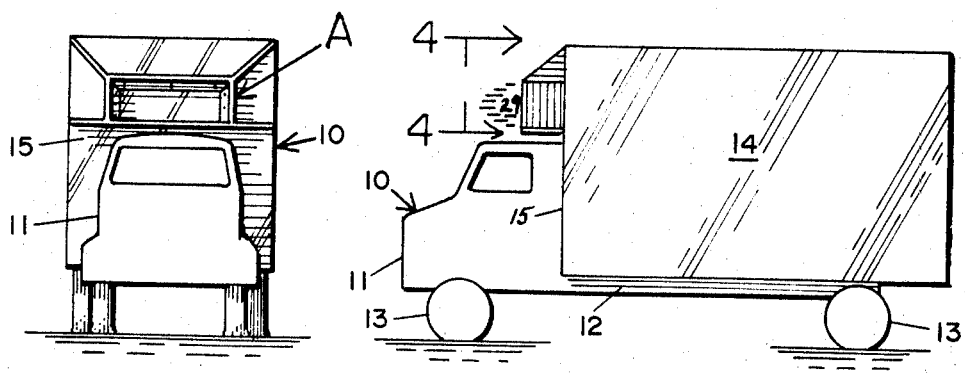
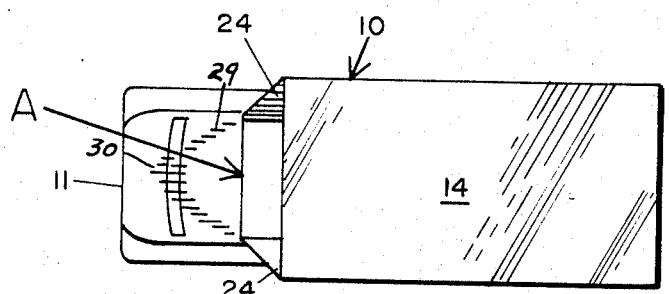
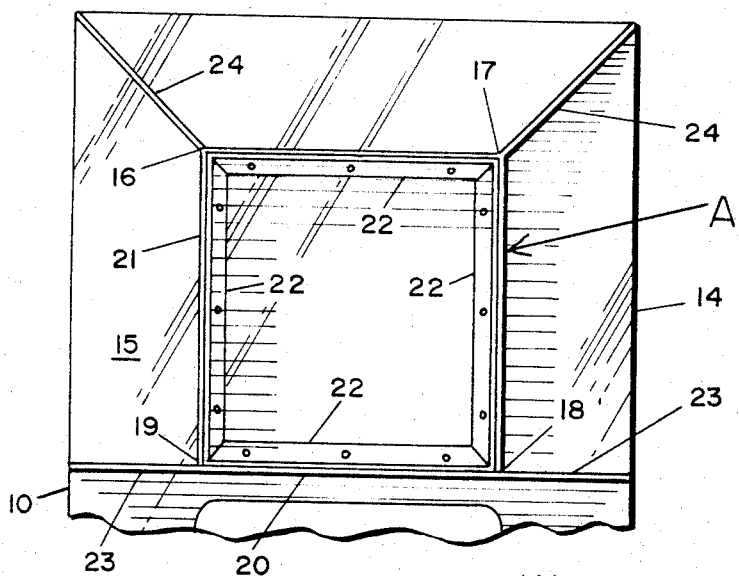
INVENTOR
WILLIAM H. KERRIGAN
BY
Salvatore G. Militano,
attorney Dec. 10, 1968 W. H. KERRIGAN 3,415,566
STREAMLINING APPARATUS FOR CARGO CARRYING VEHICLES
Filed Jan. 16, 1967 2 Sheets-Sheet 2

INVENTOR
WILLIAM H. KERRIGAN
BY
Salvatore G. Militano,
attorney

United States Patent Office 3,415,566
Patented Dec. 10, 1968

3,415,566
STREAMLINING APPARATUS FOR CARGO
CARRYING VEHICLES
William H. Kerrigan, Miami, Fla.
(1201 SW. 5th Court, Fort Lauderdale, Fla. 33312)
Filed Jan. 16, 1967, Ser. No. 609,393
4 Claims. (Cl. 296—1)

ABSTRACT OF THE DISCLOSURE

Streamlining apparatus for a cargo carrying vehicle having a front and side flat walls comprising air entrapping means having wall portions and means for securing said wall portions to said front flat wall whereby upon movement of said vehicle said air entrapping means forming a streamline buffer of air at said wall portions for reducing the resistance of the following air whereby said buffer of air directs the following air in close proximity to said side walls.

---

This invention relates to streamlining devices for reducing drag caused by air resistance and is more particularly directed to apparatus for reducing the air drag on trucks, trailer trucks and other cargo carrying vehicles.

It is readily noted that the flat front and square corner box-like cargo carriers provide the largest inside cubic capacity for carrying cargo but constitute the most inefficient of all designs as having the highest air drag characteristics. On the other extreme, the bullet-shaped front cargo carrier presented the least air drag or wind resistance but the inside cubic capacity of the cargo carrier had been reduced to such an excessive amount as to result in a loss of revenue which would far outweigh the benefits derived from the savings in fuel and time from the decreased wind resistance. Therefore, a compromise in design and loss of cargo space had to be made which resulted in the adoption of the box-like cargo carrier with from 6 to 18 inch corner radii at the front roof and side corners wherein the wind resistance has been reduced by 18–235% over the square corner fronts with a slight loss of inside cargo space. The present invention contemplates that by the use of his device the wind resistance will be further reduced and in addition thereto without the loss of any cargo space whatsoever.

Therefore, a principal object of the present invention is to provide streamlining means for cargo carriers which result in a minimum of wind resistance with no loss of cargo carrying space thereby being most economical and desirable of all conventional streamlining devices.

Another object of the present invention is to provide a streamlining device which is readily attached to the front end of box-like cargo carriers whereby the air resistance is so reduced as to effect an economy of fuel consumption without loss of cargo space.

A further object of the present invention is to provide a streamlining device for box-like cargo carriers that is simple in construction, inexpensive in cost and most effective to reduce the air drag to a minimum.

A still further object of the present invention is to provide a streamlining device on the front wall of a box-like cargo carrier which device creates a fluid body forming a streamlined buffer offering a minimum resistance to the following air.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a side elevational view of a truck embodying my invention.

FIGURES 2 and 3 are a front elevational view and a top plan view respectively thereof.

FIGURE 4 is a fragmentary cross sectional view taken along the line 4—4 of FIGURE 1.

Figure 5:
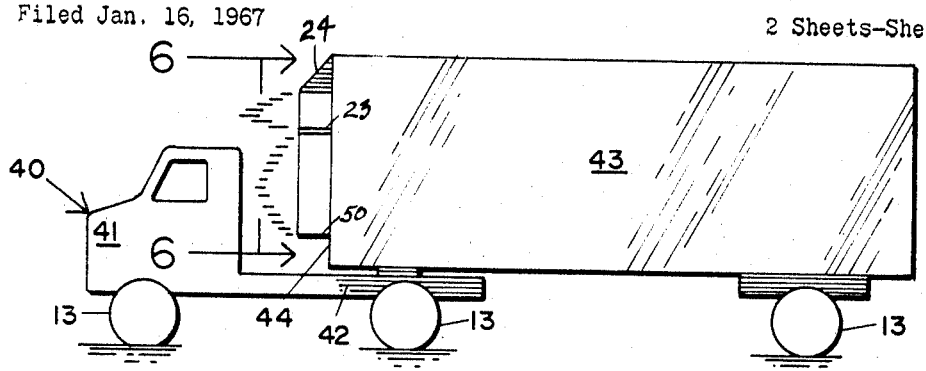
FIGURE 5 is a side elevational view of a tractor-trailer cargo carrier embodying an alternate form of my invention.

Referring to the drawing wherein like numerals are used to designate similar parts throughout the several views, the numeral 10 refers to a conventional truck having a cab portion 11 mounted on the front part of a chassis 12 that is supported on wheels 13. Supported on the chassis 12 is a box-like cargo carrier 14 all of whose side walls and in particular the front wall 15 are flat. Since the cab portion 11 is streamlined in shape, the air resistance along the lower portion of the truck 10 will be low. The airflow impinging on that portion of the flat wall 15 of carrier body 14 above the cab 11 will offer high resistance to the truck 10.

However, mounted on the front wall 15 above the cab portion 11 is my device A for streamlining the airflow to and past the box-like cargo carrier 14.

My air resistance reducing device A consists of an open receptacle formed by bending a length of sheet metal 21 or any other desirable material of appropriate width as at 16 and 17 and soldering or otherwise fastening the ends 18 and 19 of the sheet metal 21. To a length of sheet metal 20 of identical width to the inner edge portions of the sheet metal 19 and 20 angle members 22 are riveted or otherwise fastened. The angle members 22 are themselves fastened to the front wall 15. The end portions 23 of the sheet metal 20 extending from the edges 18 and 19 of the sheet metal 21 are tapered being of full width at the position of the edges 18, 19 tapering to a point at the position of the side walls of the carrier 14. A pair of diagonally disposed fins 24 are similarly shaped to that of the fins 23 and extend from the corners 16 and 17 where they are soldered to the top corners of the carrier 14. If found necessary the fins 23 and 24 may be fastened to the front wall 15 of the carrier 14.

My air resistance reducing apparatus A is formed into a rectangular shape for the reason that the cargo carrier 14 is rectangular in shape; consequently in all situations, the device A will take the same shape as the body on which it is mounted. It is a well known fact that as air flows past a body, eddy currents are set up, which are a function of air drag or resistance and the air flowing along and past the body will be diverted in a path removed from the sides of the body in proportion to the air resistance. By providing a pointed or oval front wall, the flow of air will be streamlined and move in close proximity to the sides of the body.

In the present invention, the apparatus A forms an open receptacle which traps a quantity of air therein and forms a buffer of air 29 extending forwardly and converging to a point as at 30. The following air 31 impinges on the air buffer 29, flowing along either side and top of the air buffer 29 and along the sides and top of the carrier body 14 hugging the side and top walls thereof closely. The air buffer 29 functions in the same manner as a pointed nose cone in effecting the streamlining of the following air. The fins 23 and 24 act as guide plates for the following air preventing eddy currents from being created at the juncture of the top and side walls of the carrier 14 and also at the juncture of the following air passing along the side walls of the carrier 14 below and alongside the apparatus A. The amount of resistance created by the following air that passes alongside a moving body is determined by the amount of eddies created by the moving body. It has been established that the closer the following air passes alongside the moving body, the fewer the eddies or eddy currents and the lesser the air resistance. With the use of the streamlining apparatus A, the following air 31 passes in extremely close proximity to the sides of the carrier body 14 so that the resistance is at a minimum. Also, since the air buffer 29 is fluid, any change in the speed of vehicle, velocity and direction of the following air will cause variations in the shape and size of the air buffer that results in an optimum streamlined flow of following air offering least resistance to the carrier body 14.

Figure 6:
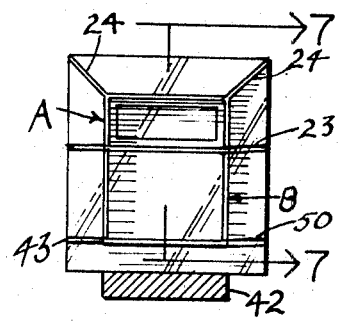
FIGURE 6 is a cross sectional view taken along the line 6—6 of FIGURE 5.
Figure 7:
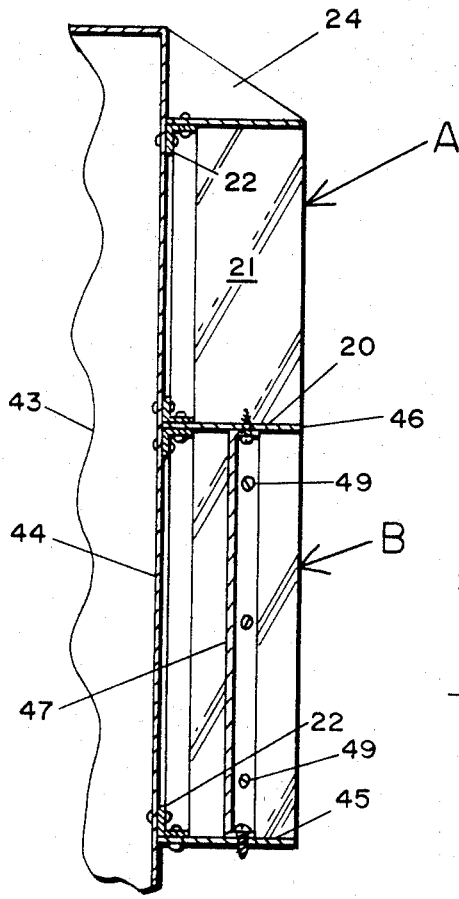
FIGURE 7 is a cross-sectional view taken along the line 7—7 of FIGURE 6.
Figure 8:
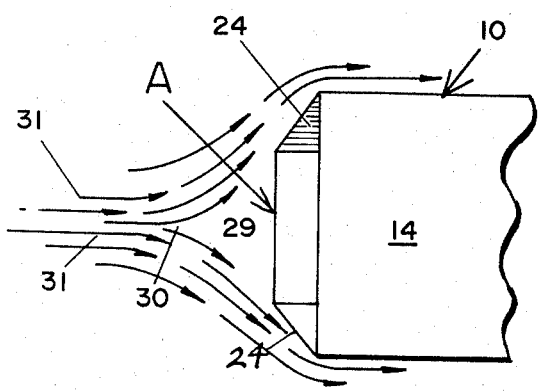
FIGURE 8 illustrates the streamlined air flow effected by my apparatus.

In the application of streamlining apparatus for a trailer-truck, a slightly modified construction of my apparatus is found to be most effective to reduce to a minimum the air resistance. As shown by FIGURE 6, the trailer truck 40 consists of a conventional tractor 41 having a chassis 42 on which the forward end portion of a trailer 43 is swivelled thereto. The trailer 43 like the box-like carrier 14 described hereinabove consists of flat walls and in particular a front flat wall 44 spaced from the rear wall of the cab 41. Consequently, the entire front wall 44 will be exposed to onflow of air as the trailer-truck 40 speeds ahead. Without any streamlining apparatus thereon, the flat wall 44 would create a maximum air resistance.

In the portion of the front wall 44 that is above the cab 41, my streamlining apparatus A shown and described hereinabove is utilized and an additional unit B is mounted on the front wall 44 below the unit A and behind the cab 41. The streamlining unit B is constructed of a length of sheet metal 45 bent into a U-shape with the free ends 46 soldered or otherwise fastened to the sheet metal 20 at the position of the ends 18, 19 of the unit A. The unit B is fastened to the wall 44 by angle iron members 22 in the same manner as in unit A. Along the bottom 45 of the unit B triangularly shaped fins 50 similar to fins 23 and 24 extend from the lower corners of the apparatus B to the outer edges of the wall 44 of the truck body 43.

However, since there is a lesser volume of air impinging on the unit B than in the unit A, the unit B is of less depth than the unit A. Consequently the unit B is provided with a choke panel 47 having flanges 48 engaging the walls 20, 45 with screws 49 fastening the members together. The choke panel 47 is adjustably mounted in the unit B so that it may be placed at its most effective position in the unit B depending on the varying factors such as speed of trailer truck and length of gap between the cab 41 and the front wall 44 of the trailer 43.

What I claim as new and desire to secure by Letters Patent of the United States is:

1. Streamlining apparatus for a cargo carrying vehicle having a front and side flat walls comprising a box-like air entrapping means having wall portions, means for securing said wall portions to said front flat wall and a plurality of tapered fins extending from said wall portions to said side walls whereby upon movement of said vehicle said air entrapping means forming a streamline buffer of air at said wall portions for reducing the resistance of the following air whereby said buffer of air directs the following air in close proximity to said side walls.

2. The structure as recited by claim 1 wherein said wall portions form a rectangular shape, said wall portions being secured to said front flat wall in spaced relation to said side flat walls and said tapering fins extending from said wall portions to the corners of said box-like cargo carrying vehicle.

3. The structure as recited by claim 2 wherein said cargo carrying vehicle comprises a tractor having a cab and a trailer mounted in spaced relation to said cab on said tractor and further wall portions mounted on said front flat wall below said first named wall portions for entrapping air passing around said tractor cab for forming a further streamline buffer of air and reducing the air resistance of the following air passing around said tractor.

4. The structure as recited by claim 3 taken in combination with a choke plate mounted within said further wall portions, said choke plate having flange portions and means securing said flange portions to be further wall portions whereby the depth of said further wall portions is reduced.

References Cited

UNITED STATES PATENTS

| | | | |
|---|---|---|---|
| 2,789,234 | 4/1957 | Lambert | 105—2.6 |
| 3,239,267 | 3/1966 | Reynolds | 296—15 |
| 2,863,695 | 12/1958 | Stamm | 296—15 |

PHILIP GOODMAN, *Primary Examiner.*

U.S. Cl. X.R.

105—2.6; 296—91